(12) United States Patent
Fu et al.

(10) Patent No.: US 11,892,367 B2
(45) Date of Patent: Feb. 6, 2024

(54) METHOD TO MEASURE LIGHT LOSS OF OPTICAL FILMS AND OPTICAL SUBSTRATES

(71) Applicant: Applied Materials, Inc., Santa Clara, CA (US)

(72) Inventors: Jinxin Fu, Fremont, CA (US); Kang Luo, Santa Clara, CA (US); Fariah Hayee, San Jose, CA (US); Ludovic Godet, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 69 days.

(21) Appl. No.: 17/692,573

(22) Filed: Mar. 11, 2022

(65) Prior Publication Data
US 2022/0291083 A1 Sep. 15, 2022

Related U.S. Application Data

(60) Provisional application No. 63/159,664, filed on Mar. 11, 2021.

(51) Int. Cl.
*G01M 11/02* (2006.01)
(52) U.S. Cl.
CPC .... G01M 11/0285 (2013.01); G01M 11/0207 (2013.01)
(58) Field of Classification Search
CPC ......... G01M 11/0285; G01M 11/0207; G01M 11/35; G01M 11/0292; G01N 2021/9511; G01N 21/958
See application file for complete search history.

(56) References Cited

U.S. PATENT DOCUMENTS

| | | | |
|---|---|---|---|
| 6,385,355 B1 | 5/2002 | Nashimoto et al. | |
| 2003/0030786 A1 | 2/2003 | Shurgalin et al. | |
| 2007/0133936 A1 | 6/2007 | Sato et al. | |
| 2011/0273719 A1 | 11/2011 | Froggatt | |
| 2016/0244874 A1 | 8/2016 | Ge et al. | |
| 2018/0038769 A1* | 2/2018 | Hayashi | G01M 11/335 |
| 2022/0011238 A1* | 1/2022 | Caruso | G06T 7/0004 |
| 2022/0082840 A1* | 3/2022 | Naß | G02B 27/0081 |

FOREIGN PATENT DOCUMENTS

| | | | | |
|---|---|---|---|---|
| WO | 2006023862 A1 | | 3/2006 | |
| WO | WO-2006023862 A1 | * | 3/2006 | ........... G02B 6/1228 |

OTHER PUBLICATIONS

International Search Report dated Jun. 29, 2022 for Application No. PCT/US2022/019897.

* cited by examiner

*Primary Examiner* — Tarifur R Chowdhury
*Assistant Examiner* — Carlos Perez-Guzman
(74) *Attorney, Agent, or Firm* — Patterson + Sheridan, LLP

(57) ABSTRACT

A method of optical device metrology is provided. The method includes introducing a first type of light into a first optical device during a first time period, the first optical device including an optical substrate and an optical film disposed on the optical substrate, the first optical device further including a first surface, a second surface, and one or more sides connecting the first surface with the second surface; and measuring, during the first time period, a quantity of the first type of light transmitted from a plurality of locations on the first surface or the second surface during the first time period, wherein the measuring is performed by a detector coupled to one or more fiber heads positioned to collect the light transmitted from the plurality of locations.

20 Claims, 7 Drawing Sheets

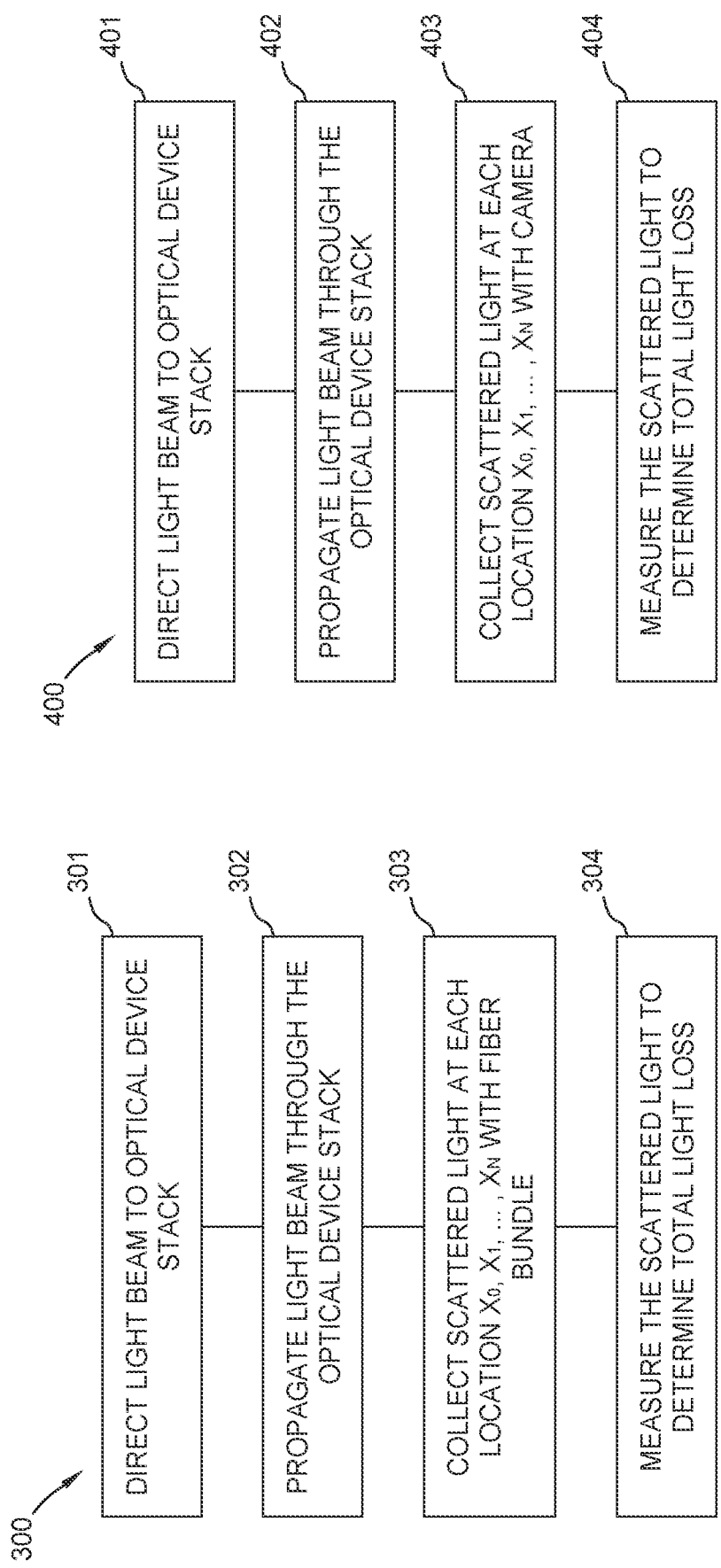

METHOD TO MEASURE LIGHT LOSS OF OPTICAL FILMS AND OPTICAL SUBSTRATES

CROSS-REFERENCE TO RELATED APPLICATIONS

This application claims the benefit of U.S. Provisional Patent Application No. 63/159,664, filed on Mar. 11, 2021, the contents of which are herein incorporated by reference.

BACKGROUND

Field

Embodiments of the present disclosure relate to optical devices. More specifically, embodiments of the present disclosure relate to a measurement system and a method to measure total light loss of at least one of an optical film or an optical substrate.

Description of the Related Art

Optical devices including waveguide combiners, such as augmented reality waveguide combiners, and flat optical devices, such as metasurfaces, are used to assist in overlaying images. Generated light is propagated through the optical device until the light exits the optical device and is overlaid on the ambient environment for the user to see.

Fabricated optical devices can lose light intensity through absorption and scattering as the light is propagated through the optical device. The optical devices are fabricated from optical substrates, and in some instances optical films, e.g., when an optical device is fabricated from an optical film disposed on an optical substrate. Light loss from the optical film and the optical substrate can be measured prior to fabricating an optical device. Single interaction measurement systems, such as spectroscopy systems, do not reliably measure the amount of light lost as light propagates through an optical device. Furthermore, it is challenging to measure low level light loss (e.g., light loss from an optical device due to scattering) with detectors of normal sensitivity. Additionally, it is difficult to determine whether the light loss is due to absorption or due to scattering.

Therefore, what is needed in the art is a measurement system and a method to measure total light loss of at least one of an optical film or an optical substrate.

SUMMARY

In one embodiment, a method of optical device metrology is provided. The method includes introducing a first type of light into a first optical device during a first time period, the first optical device comprising an optical substrate and an optical film disposed on the optical substrate, the first optical device including a first surface, a second surface, and one or more sides connecting the first surface with the second surface; and measuring, during the first time period, a quantity of the first type of light transmitted from a plurality of locations on the first surface or the second surface during the first time period, wherein the measuring is performed by a detector coupled to one or more fiber heads positioned to collect the light transmitted from the plurality of locations.

In another embodiment, a method of optical device metrology is provided. The method includes introducing a first type of light into a first optical device during a first time period, the first optical device comprising an optical substrate and an optical film disposed on the optical substrate, the first optical device including a first surface, a second surface, and one or more sides connecting the first surface with the second surface; and measuring, during the first time period, a quantity of the first type of light transmitted from a plurality of locations on the first surface or the second surface during the first time period, wherein the measuring is performed by a detector coupled to a camera positioned to collect the light transmitted from the plurality of locations.

In yet another embodiment, a method of optical device metrology is provided. The method includes: a) introducing a first type of light into a first optical device during a first time period, the first optical device comprising an optical substrate and optical film, the first optical device including a first surface, a second surface, and one or more sides connecting the first surface with the second surface; b) measuring, during the first time period, a quantity of the first type of light transmitted from a plurality of locations on the first surface or the second surface during the first time period, wherein the measuring is performed by a detector configured to receive the light transmitted from the plurality of locations; repeating operations a) and b) for a second optical device that includes one or more of a different optical substrate and a different optical film than the first optical device; and selecting the first optical device or the second optical device for a larger production run based on differences between the measurements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 3 is a flow diagram of a method to measure light loss of an optical device stack according to embodiments.

FIG. 4 is a flow diagram of a method to measure light loss of an optical device stack according to embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
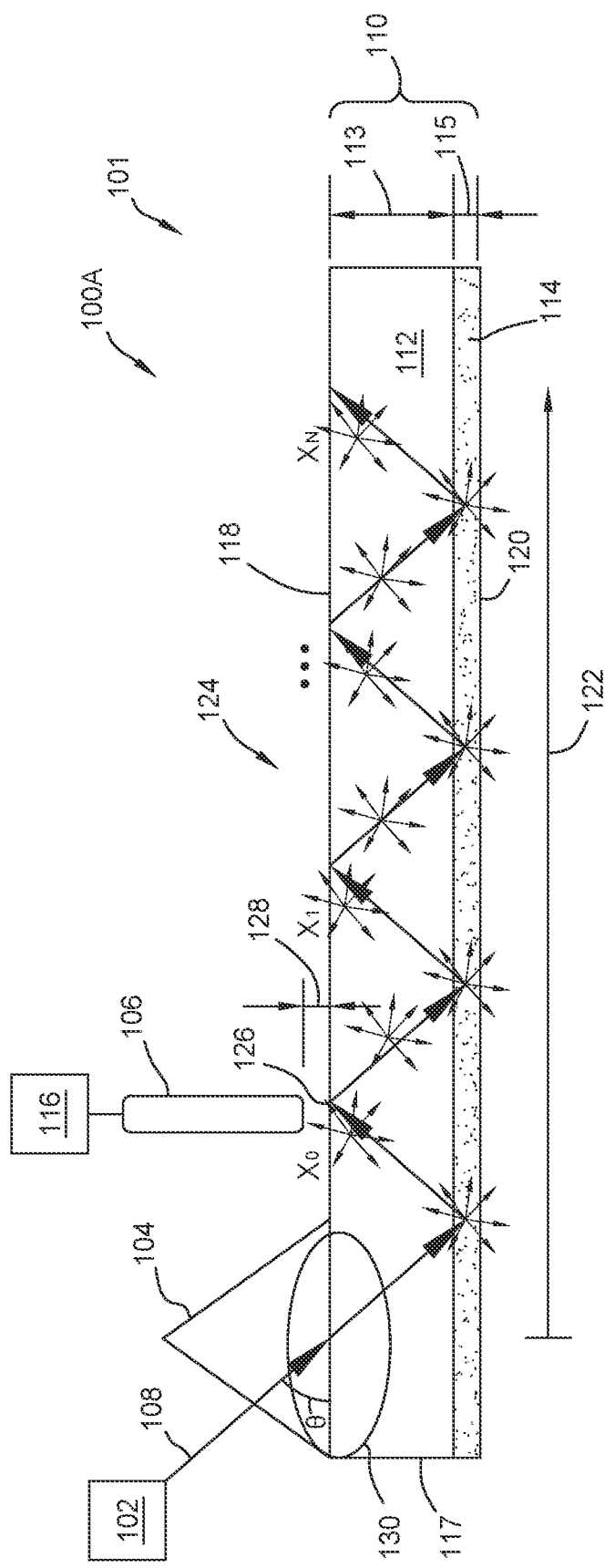
FIGS. 1A-1D are schematic, cross-sectional views of configurations of a measurement system according to embodiments.

Embodiments of the present disclosure relate to a measurement system and a method to measure total light loss of at least one of an optical film and an optical substrate. The measurement system includes a light source configured to direct a light beam. The measurement system further includes a prism operable to direct the light beam into an optical device stack. The light beam can propagate in the optical device stack between a first surface and a second surface for a length of the optical device stack. The measurement system can further include a fiber bundle, or a camera disposed above or below the optical device stack to collect light loss from the optical device stack, for example light loss due to scattering. The measurement system further includes a detector coupled to the fiber bundle or the camera to perform a measurement (e.g., an intensity measurement) on the light loss from various points along one or more surfaces of the optical device stack.

FIGS. 1A-1D are schematic cross-sectional views of configurations 100A-100D of a measurement system 101. As shown, the measurement system 101 includes a light source 102, a prism 104, a fiber bundle 106, and a detector 116. The measurement system 101 is operable to determine a total light loss of an optical device stack 110 after light is coupled into the optical device stack 110.

The optical device stack 110 includes an optical substrate 112 and an optical film 114. In some embodiments, the optical device stack 110 can include two or more optical films. One of the optical films 114 and/or the optical substrate 112 may be patterned such that the optical device stack 110 is an optical device having optical device structures. The optical device stack 110 can include a first surface 118 and a second surface 120, and one or more sides 117 connecting the first surface 118 with the second surface 120. The first surface 118 can be a surface of the substrate 112. The second surface 120 can be a surface of the optical film 114. In varying embodiments, this optical device stack 110 may be a waveguide combiner, such as an augmented reality waveguide combiner or a microscale waveguide, or a flat optical device, such as metasurface.

As described in fuller detail below, the measurement system 101 may be utilized in a method 300 (see FIG. 3) to determine a total light loss from the optical device stack 110 when light is coupled into the optical device stack 110. Although the following disclosure mainly describes measurements being performed on an optical device stack, the same measurements can be performed on an optical device consisting of a single material, such as the optical substrate 112. As described in more detail below, performing the same measurements on just the substrate 112 without the optical film 114 can be used for determining the optical loss caused by the substrate 112, which can then enable a determination of the portion of optical loss caused by the optical film 114 when the measurements are performed on the optical device stack 110.

The fiber bundle 106 can include two or more fiber heads (not individually shown). In some embodiments, a single fiber head can be used. In other embodiments, other optical devices configured to collect light can also be used.

The optical substrate 112 can be any type of substrate used in the art. In some embodiments, the optical substrate can be transparent or semi-transparent depending on the use of the optical substrate. In some embodiments, the optical substrate 112 can be opaque to certain types of radiation. The material of the optical substrate 112 can include silicon (Si) or glass, according to some embodiments. The optical substrate 112 can be any size or shape, including but not limited to, 150 mm, 200 mm, or 300 mm diameter wafers. In some embodiments, the optical substrate 112 can have a refractive index between about 1.1 and about 4. The optical substrate 112 can have an optical substrate thickness 113 from about 0.1 mm to about 5 mm.

The optical film 114 can be formed from a variety of materials. These materials can include, but are not limited to, one or more of silicon oxycarbide, titanium oxide, silicon oxide, vanadium oxide, aluminum oxide, aluminum-doped zinc oxide, indium tin oxide, tin dioxide, zinc oxide, tantalum pentoxide, silicon nitride, silicon oxynitride, zirconium oxide, niobium oxide, cadmium stannate, silicon carbonnitride containing material, or any other suitable material. More generally, the benefits of this disclosure can apply to any optical film formed of any material configured to transmit light in an optical device. In some embodiments, the optical film 114 has an optical film thickness 115 of about 1 nm to about 10 μm. The optical film 114 is disposed over (e.g., directly on) the optical substrate 112.

The light source 102 is configured to generate and direct a light beam 108 to be incident on the optical device stack 110. The optical device stack 110 can be held in position by a stage (not shown) or by fasteners (not shown). The light source 102 can be any light source used in the art. In some embodiments, the light beam 108 (also referred to as a first type of light) can be a single wavelength laser with a narrow bandwidth (e.g., <1 pm). In other embodiments, the light source 102 can be configured to emit a variety of wavelengths, such as a light source that includes two or more lasers. For example, in some embodiments, the light source 102 can be configured to emit ultraviolet light, visible light, infrared light, and/or near infrared light as well as radiation of other wavelengths.

As shown in FIG. 1A, the light beam 108 can be coupled into the optical device stack 110 through the prism 104. The prism 104 improves the coupling efficiency of the light beam 108 into the optical device stack 110. The prism 104 can have a refractive index between about 1.3 and about 3.3. The prism 104 is coupled to the optical device stack 110. In one embodiment, which can be combined with other embodiments, a grating (not shown) can be used with or without the prism 104 to couple the light beam 108 to the optical device stack 110. Although the angle of the light beam 108 is not shown to change at all through the prism 104 or optical device stack 110, this was done for ease of illustration and the angle may change due to varying refractive indexes of the different materials through which the light beam 108 passes.

The light beam 108 is incident on the optical device stack 110 at a total internal reflection (TIR) angle $\theta$ with respect to a first surface 118 or a second surface 120 of the optical device stack 110. The TIR angle $\theta$ is generally between about 15° and about 85°, but angles closer to parallel or perpendicular to the surface (e.g., first surface 118) may also be used. The light beam 108 undergoes TIR along a length 122, which can be part or all of the length of the optical device stack 110. The length 122 can correspond to the length the light beam 108 propagates through the optical device stack 110. In some embodiments, the length 122 can between about 2 mm and about 200 mm, but can be shorter or longer depending on the application. Longer distances can allow for larger drops in intensity of the light beam 108, which can assist in determining the portions of optical loss caused by the substrate 112 and the portion caused by the optical film 114.

The light beam 108 can propagate through the optical device stack 110 and can be incident upon a plurality of contact points 124 located at or near the surface from which the measurements of intensity are detected (e.g., first surface 118 in FIG. 1A). The plurality of contact points 124 each have a location $X_0, X_1 \ldots X_N$ (also referred to as a plurality of locations) along the length 122, where N is a total number of the plurality of contact points 124 from which the measurements are taken. Increasing the TIR angle $\theta$ can increase the number of the locations $X_0, X_1 \ldots X_N$ leading to more data while decreasing the TIR angle $\theta$ can decrease the number of the locations $X_0, X_1 \ldots X_N$ leading to data that is further spread apart and thus can be more easily analyzed (i.e., the data is less noisy) for determining the optical loss portions of the substrate 112 and the optical film 114.

While the light beam 108 is directed at the optical device stack 110, the fiber bundle 106 moves along the length 122 of the optical device stack 110. In some embodiments, the fiber bundle 106 and detector 116 can collect scattered light 126 at each location $X_0$, $X_1$ ... $X_N$. For example, the fiber bundle 106 can move along the length 122 to take different measurements of the light beam 108 as the light beam 108 propagates through the optical device stack 110. The fiber bundle 106 can move along the length 122 with a gap 128 between the fiber bundle 106 and one of the first surface 118 (see FIG. 1A) or the second surface 120 (see FIG. 1C) of the optical device stack 110. In some embodiments, the gap 128 can be constant as the fiber bundle 106 collects the scattered light 126 at each location $X_0$, $X_1$ ... $X_N$.

The fiber bundle 106 is in communication with the detector 116. The detector 116 can measure an intensity (also referred to as a quantity) of the scattered light 126 collected by the fiber bundle 106 at each location $X_0$, $X_1$ ... $X_N$. In some embodiments, the detector 116 can include a Gaussian aperture.

The detector 116 is configured to measure the intensity of the scattered light 126 across the length 122. These intensity measurements can also be modeled by the following equation $$\log I_N = \log I_0 - (\alpha_{bulk}*X + \alpha_{surf})*N$$

where $\alpha_{bulk}*X_0 + \alpha_{surf}$ is the total light loss from the optical device stack 110 due to absorption and scattering, $\alpha_{bulk}$ is the total light loss caused by the substrate 112, $\alpha_{surf}$ is the total light loss caused by the optical film 114, X is the distance between successive measuring points at which the light encounters the optical film 114 due to TIR (e.g., a distance between $X_0$ and $X_1$ in FIG. 1C), $I_N$ is the intensity measured at a location $X_N$, $I_0$ is the intensity measured at the location $X_0$, and N is the number of times the light has encountered the optical film 114 due to TIR at the location $X_N$. The amount of light loss due to the substrate 112 ($\alpha_{bulk}$) is related to the distance the light travels through the substrate 112, and surface optical loss caused by the substrate surface is found to be negligible. Thus, $\alpha_{bulk}$ has units of reciprocal distance (e.g., $cm^{-1}$) that are the reciprocal of the units of X (e.g., cm). Conversely, the amount of light loss caused by optical film 114 ($\alpha_{surf}$) is primarily due to surface interaction of the light beam 108 with the surface of the optical film 114. Thus, this light loss is controlled by the number of interactions the light beam has with the surface of the optical film (i.e., N in the equation above) at a given location $X_N$.

The same measurements can be performed on the optical substrate 112 before the optical film 114 is formed on the optical substrate 112. For example, referring to FIG. 1A, the same measurements means that the same type of light is provided (also referred to as introduced) into the same location on the optical substrate 112 as the light is provided after the optical film 114 is formed on the optical substrate 112, and then the measurements are taken from these same locations. When the light is provided through the optical film 114 (see e.g., FIG. 1C) and/or the measurements are taken from light transmitting from the optical film (see e.g., FIG. 1C), then the same measurements means that all the locations for providing (e.g., introducing) the light and making the measurements only vary in the vertical direction shown on the sheet for the FIGS. 1A-1D (i.e., the direction in which the thicknesses 113, 115 are measured).

When these same measurements are performed on the optical substrate 112 before the optical film 114 is formed on the optical substrate 112, then the equation above reduces to $\log I_N = \log I_0 - (\alpha_{bulk}*X)*N$ with the only unknown being $\alpha_{bulk}$. Thus, the intensity measurements $I_N$ at each location $X_N$ allow $\alpha_{bulk}$ (i.e., the light loss caused by the substrate) to be determined. Then, $\alpha_{bulk}$ can be applied to the equation above $\log I_N = \log I_0 - (\alpha_{bulk}*X)*N$ for the measurements performed on the optical device stack 110 that includes the optical film 114 allowing the light loss caused by the optical film 114 (i.e., $\alpha_{surf}$) to be determined as $\alpha_{surf}$ is the only remaining unknown in that equation after $\alpha_{bulk}$ is determined from the measurements performed on just the optical substrate 112.

When using the measurements and equations above to determine the optical loss caused by the substrate 112 and the optical loss caused by the optical film 114, it is assumed that the scattered light 126 is Rayleigh scattering (isotropic scattering), backwards reflection is not present, and big scatters of the scattered light 126 do not exist.

The intensity of the light beam 108 decays in the optical device stack 110 or just the optical substrate 112 due to absorption and scattering. The decay due to absorption is generally a relatively consistent decay. For example, the intensity decay due to absorption for some materials can follow a downward sloping line or curve that does not include any significant portions in which there is a positive slope for the intensity. On the other hand, the decay due to scattering is much less consistent and results in a series of peaks and troughs, where the intensity of the peaks and troughs decay as the light beam propagates though the optical device stack 110 or substrate 112. Thus, when the intensity measurements indicate significant scattering as shown by large peaks and troughs in the recorded intensity measurements, then adjustments can be made to the optical device stack 110 or substrate 112. For example, surface roughness can be reduced to decrease the amount of scattering. Furthermore, adjustments to the stoichiometry of a given optical film can be adjusted to adjust the amount of scattering that the optical film causes.

FIGS. 1A-1D are schematic, cross-sectional views of different configurations 100A-100D of the measurement system 101. As shown in FIG. 1A, a first configuration 100A of the measurement system 101 has the light source 102 and the fiber bundle 106 positioned over the first surface 118 of the optical device stack 110. The optical film 114 includes the second surface 120 that opposes the first surface 118. The prism 104 is disposed on the first surface 118 of the optical device stack 110. An index matching oil 130 can be disposed between the prism 104 and the optical device stack 110. The index matching oil 130 can improve the coupling efficiency of the light beam 108 into the optical device stack 110.

Figure 1B:
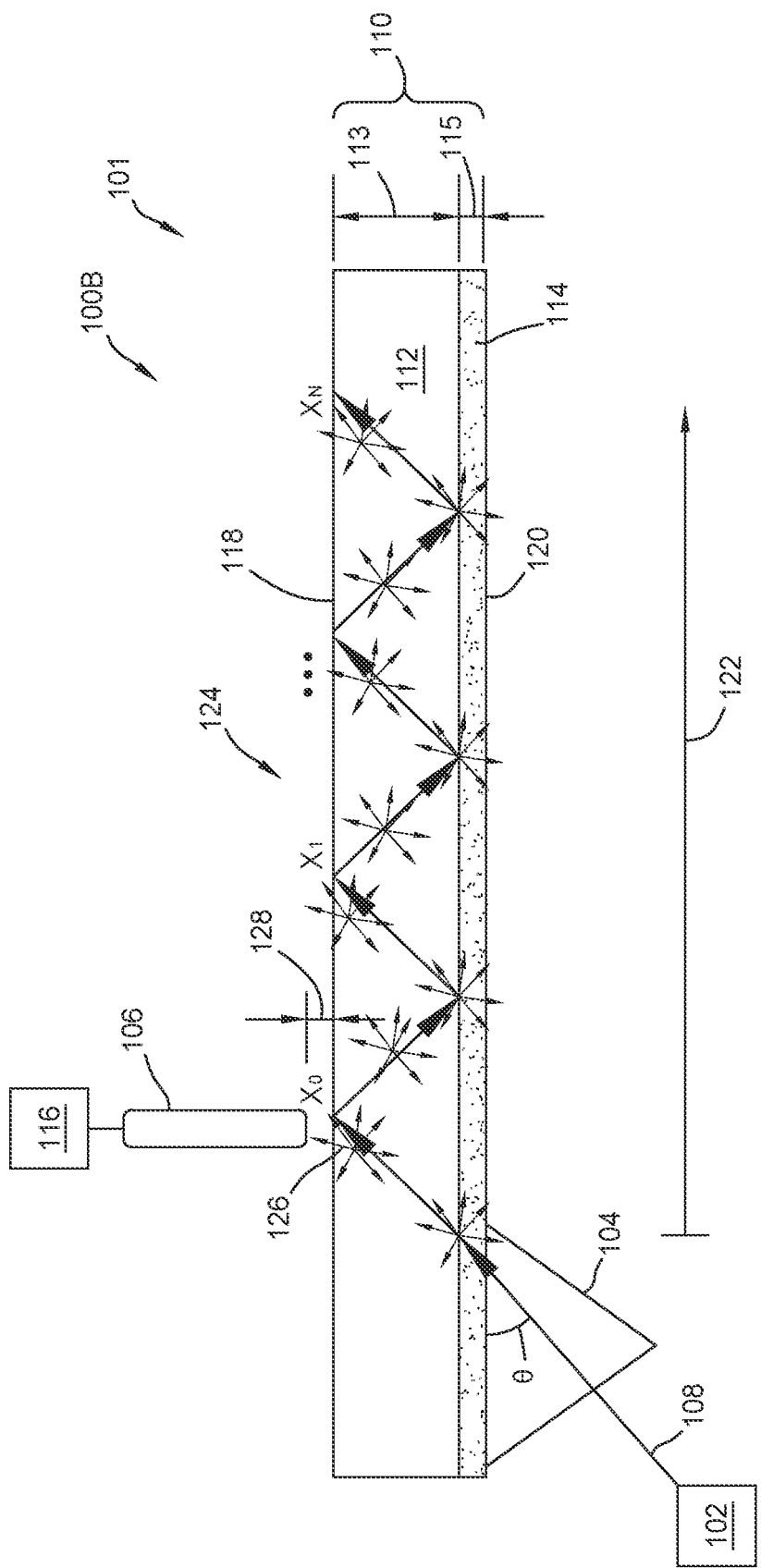

As shown in FIG. 1B, a second configuration 100B of the measurement system 101 is shown. In the second configuration 100B, the fiber bundle 106 is positioned over the first surface 118 of the optical device stack 110, and the light source 102 is directed at the second surface 120 of the optical device stack 110. The prism 104 is disposed on the second surface 120 of the optical device stack 110. Thus, as shown in FIGS. 1A and 1B, the fiber bundle 106 is configured to collect the scattered light 126 at each location $X_0$, $X_1$ ... $X_N$ when the light beam 108 is incident on the first surface 118 (FIG. 1A) or the second surface 120 (FIG. 1B) of the optical device stack 110.

Figure 1C:
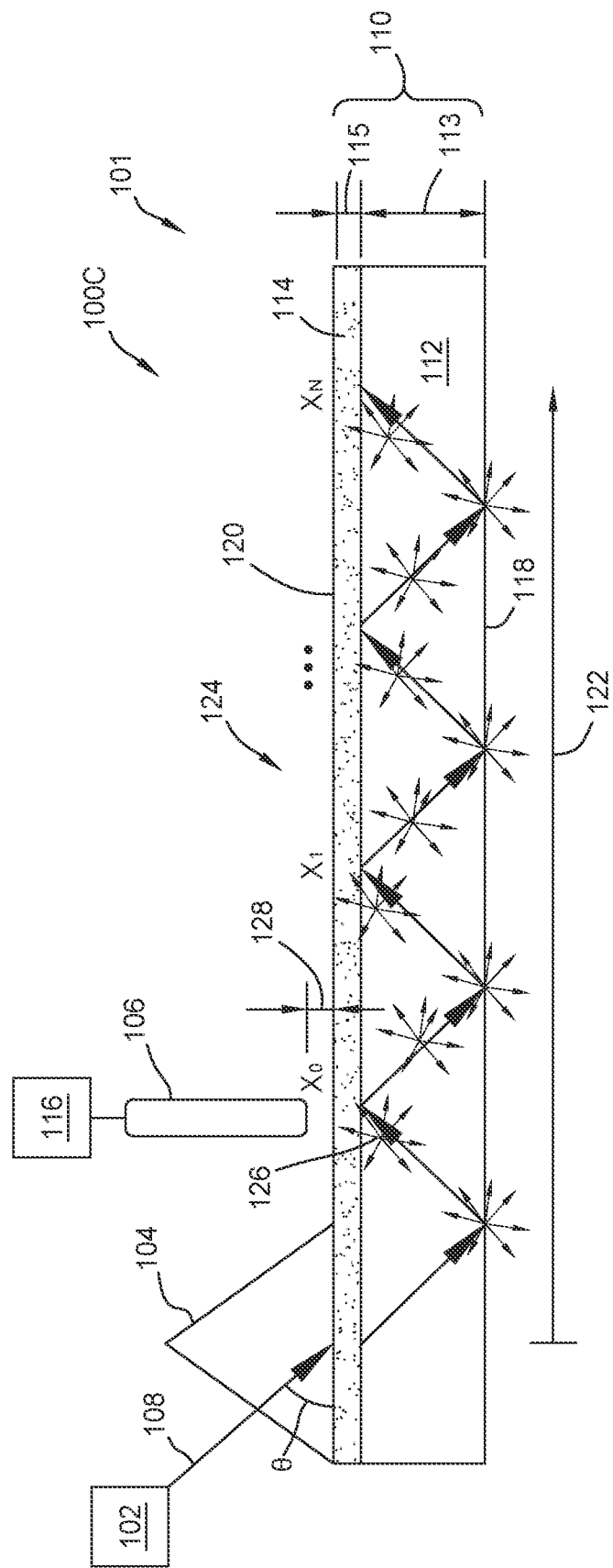

As shown in FIG. 1C, a third configuration 100C of the measurement system 101 is shown. In the third configuration 100C, the optical device stack 110 is flipped upside down relative to the orientation of the optical device stack 110 shown in FIGS. 1A and 1B. Furthermore, the light source 102 and the fiber bundle 106 are positioned over the second surface 120 of the optical device stack 110. Additionally, the prism 104 is disposed on the second surface 120 of the optical device stack 110. In this third configuration 100C, the fiber bundle 106 collects light measurements from locations $X_0, X_1 \ldots X_N$ on the second surface 120 of the optical film 114 as opposed to the first surface 118 of the substrate 112 as shown in FIGS. 1A and 1B.

Figure 1D:
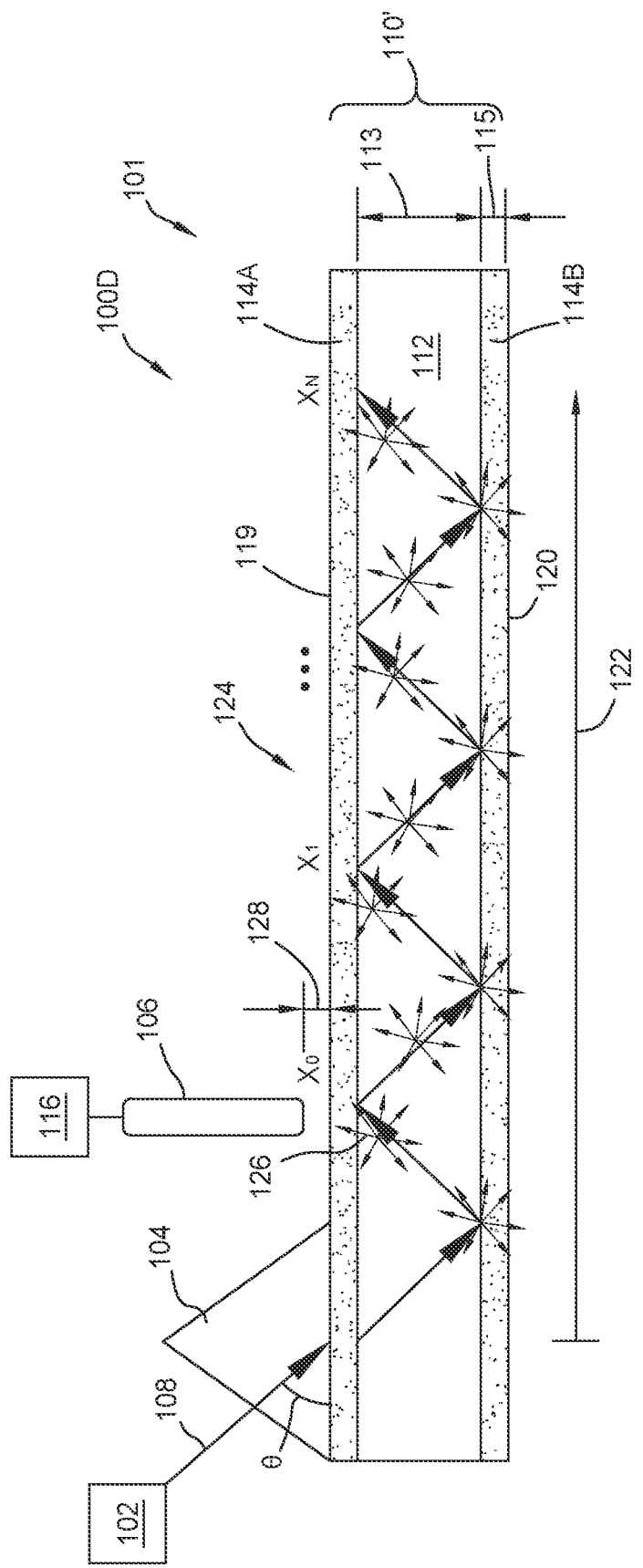

As shown in FIG. 1D, a fourth configuration 100D of the measurement system 101 is shown. In the fourth configuration 100D, measurements are performed on a second optical stack 110'. The second optical stack 110' is the same as the optical stack 110 described above except that the second optical stack 110' includes an optical film 114 formed on both sides of the substrate 112. For example, the second optical stack 110' includes a first optical film 114A formed over a first side of the substrate 112 (i.e., the top side in FIG. 1D) and a second optical film 114B formed over a second side of the substrate 112 (i.e., the lower side in FIG. 1D). The first optical film 114A includes a first surface 119 that faces the fiber bundle 106. The second optical film 114B includes a second surface 120 that can be the same as the second surface 120 described above in reference to FIGS. 1A-1C.

In the fourth configuration 100D, the light source 102 and the fiber bundle 106 are positioned over the first surface 119 of the first optical film 114A of the second optical device stack 110'. Additionally, the prism 104 is disposed on the first surface 119 of the first optical film 114A of the second optical device stack 110'. The fiber bundle 106 is configured to collect the scattered light 126 from each location $X_0$, $X_1 \ldots X_N$ on the first surface 119 of the first optical film 114A of the second optical device stack 110' in a similar manner as described above for collecting light from the first surface 118 in the first configuration 100A of FIG. 1A.

Figure 2A:
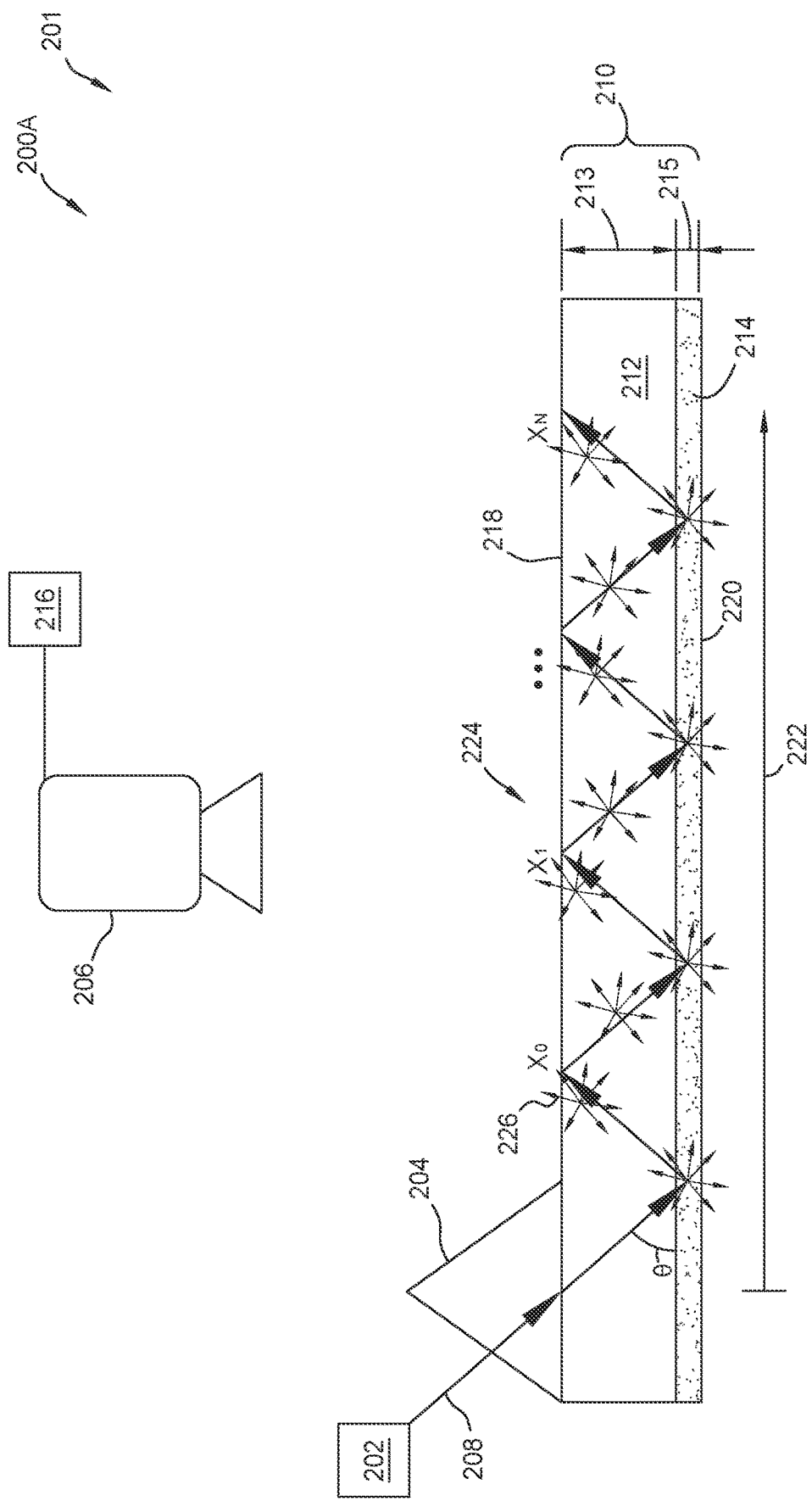
FIGS. 2A and 2B are schematic, cross-sectional views of configurations of a measurement system according to embodiments.
Figure 2B:
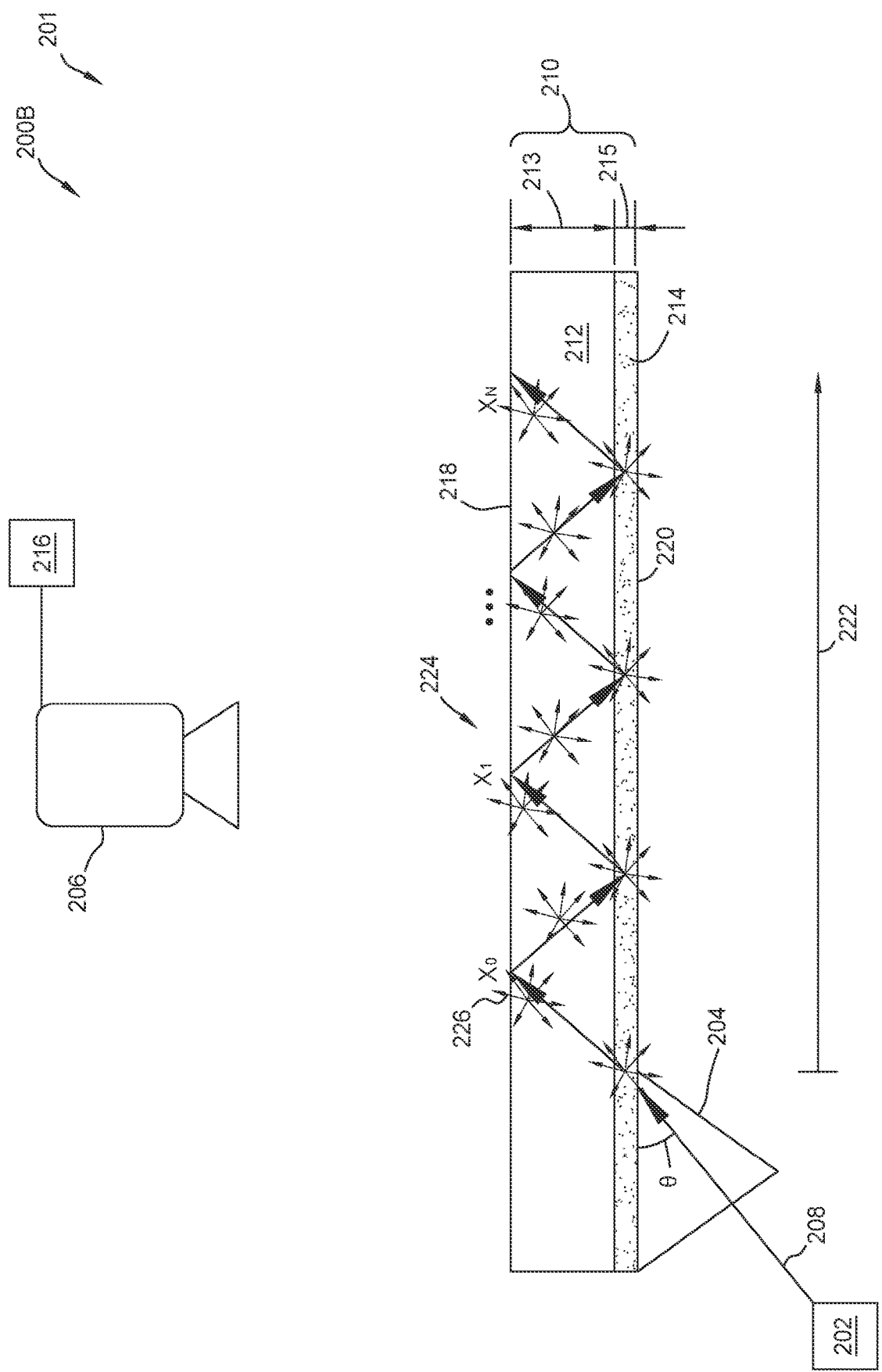

FIGS. 2A and 2B are schematic cross-sectional views of configurations 200A and 200B of a measurement system 201. The measurement system 201 can be the same as the measurement system 101 described above except that the measurement system 201 includes a camera 206 in place of the fiber bundle 106 described above. Every other in FIGS. 2A, 2B has a corresponding element in in FIGS. 1A-1D with the only difference being that the reference numerals in FIGS. 2A, 2B start with a "2" and the reference numerals for the corresponding elements in FIGS. 1A-1D start with a "1". For example, FIGS. 2A and 2B show that the measurement system 201 includes a light source 202, a prism 204, and a detector 216 that can be the same as the light source 102, the prism 104, and the detector 116 shown in FIGS. 1A-1D. The light beam 208 corresponds to the light beam 108 described above. The surfaces 218, 220 correspond to the surfaces 118, 120 described above. The length 222 corresponds to the length 122 described above. The optical stack 210 corresponds to the optical 110 described above. The thicknesses 213, 215 correspond to the thicknesses 113, 115 described above. The substrate 212 and the optical film 214 correspond to the substrate 112 and optical film 114 described above. The scattered light 226 corresponds to the scattered light 126 described above. The plurality of contact points 224 corresponds to the plurality of contact points 124 described above.

In some embodiments, the detector 216 is part of the camera 206. The camera 206 can have a field of view to collect all of the intensity measurements from the optical device stack without the camera 206 or the optical device stack 210 moving.

The measurement system 201 is operable to determine a total light loss of an optical device stack 210 after the light beam 208 is coupled into the optical device stack 210 as well as a portion of light loss caused by the substrate and a portion of light loss caused by the optical film in a similar manner as described above in reference to FIGS. 1A and 1B. As described in fuller detail below, the measurement system 201 may be utilized in a method 400 (see FIG. 4) to determine a total light loss of the optical device stack 210.

FIGS. 2A and 2B are schematic, cross-sectional views of configurations 200A and 200B of the measurement system 201. As shown in FIG. 2A, a configuration 200A of the measurement system 201 includes the light source 202 and the camera 206 positioned over the first surface 218 of the optical device stack 210 in an arrangement that corresponds to the positioning of the light source 102 and the fiber bundle 106 in FIG. 1A. The description above in reference to FIG. 1A applies to all other elements in FIG. 2A with the exception of the camera 206 replacing the fiber bundle 106.

As shown in FIG. 2B, a configuration 200B of the measurement system 201 includes the light source 202 positioned below the second surface 220 of the optical device stack and the camera 206 positioned over the first surface 218 of the optical device stack 210 in an arrangement that corresponds to the positioning of the light source 102 and the fiber bundle 106 in FIG. 1B. The description above in reference to FIG. 1B applies to all other elements in FIG. 2B with the exception of the camera 206 replacing the fiber bundle 106.

FIG. 3 is a flow diagram of method 300 of optical device metrology to measure total light loss of an optical device stack, such as the optical device stacks 110, 110' described above in reference to FIGS. 1A-1D. The method 300 is operable to be performed with one or more of the configurations 100A-100D of a measurement system 101. To facilitate explanation, the method 300 will be described with reference to the measurement system 101 of FIGS. 1A-1D.

At operation 301, the light source 102 directs the light beam 108 to the optical device stack 110. The optical device stack 110 may include one or both of the optical substrate 112 and the optical film 114.

In one embodiment, which can be combined with other embodiments described herein, the light beam 108 is coupled into the optical device stack 110 via the prism 104. In another embodiment, which can be combined with other embodiments described herein, the light beam 108 is coupled into the optical device stack 110 via a grating (not shown). In yet another embodiment, which can be combined with other embodiments described herein, an index matching oil 130 is disposed between the prism 104 and the optical device stack 110. The light beam 108 is incident on the optical device stack 110 at a total internal reflection (TIR) angle θ.

At operation 302, the light beam 108 propagates through the optical device stack 110. The light beam 108 propagates to be incident upon the plurality of contact points 124 as described above in reference to FIGS. 1A-1D. The light beam 108 propagates through the optical device stack 110 via TIR.

At operation 303, the fiber bundle 106 collects scattered light 126 at each location $X_0, X_1 \ldots X_N$. The fiber bundle 106 moves along the length 122 to collect the scattered light 126 at each location $X_0, X_1 \ldots X_N$. The fiber bundle 106 may be disposed above the first surface 118 (see e.g., FIG. 1A) or the second surface 120 (see e.g., FIG. 1C) of the optical device stack 110.

At operation 304, a detector 116 in communication with the fiber bundle 106 measures the intensity of the scattered light 126 collected by the fiber bundle 106 at each location $X_0, X_1 \ldots X_N$. The intensity measurements can then be used to determine the total optical loss for the optical device stack 110. Intensity measurements performed on the substrate 112 only can be used to determine the total optical loss caused by the substrate 112 (i.e., $\alpha_{bulk}$) as described above in reference to this equation $\log I_N = \log I_0 - (\alpha_{bulk}*X)*N$. Then, $\alpha_{bulk}$ can be applied to this equation $\log I_N = \log I_0 - (\alpha_{bulk}*X + \alpha_{surf})*N$ to determine the total optical loss caused by the optical film 114 (i.e., $\alpha_{surf}$) as described above.

Then, the magnitude between successive peaks and troughs in the intensity decay measurements can be used to determine a relative amount of optical loss due to scattering with high magnitudes between successive peaks and troughs indicating high scattering and a corresponding low magnitude indicating lower amounts of scattering. If high scattering is identified, then changes to the substrate and/or optical film can be made, such as reducing the surface roughness or changing the stoichiometry of the optical film and/or substrate. Furthermore, the magnitude between successive peaks and troughs for the measurements performed on the optical substrate 112 only (i.e., no optical film) can help determine the relative contribution of the scattering caused by the substrate 112 as opposed to the optical film 114.

The method 300 can be repeated, so that the optical loss caused by the substrate 112 can be separated from the optical loss caused by the optical film 114. For example, during an earlier time period before the optical film 114 is formed on the optical substrate 112, the method 300 can be performed on just the substrate 112. Then during a subsequent time period after the optical film 114 has been formed on the substrate 112, the method 300 can be repeated, so that the optical loss caused by the substrate 112 and the optical film 114 can be separately determined as described above.

The method 300 can then be repeated for different optical substrates and/or optical films, so that appropriate optical substrates and/or optical films for different applications can be more quickly identified. The method 300 enables the total amount of light loss caused by the optical substrate 112 to be separated from the total amount of light loss caused by the optical film 114, which enables the method 300 to be used to quickly identify appropriate optical substrates and/or optical films for different applications (e.g., an augmented reality application that uses a waveguide combiner). Repeating the method 300 can also be used to identify when light scattering is reduced by analysis of the magnitude between the peaks and troughs in the measurements as described. Thus, by repeating the method 300 for different optical substrates and/or optical films, optical device stacks can be identified that have, for example, lower amounts of total light loss or lower amounts of light scattering, which can be beneficial for optical device applications.

FIG. 4 is a flow diagram of method 400 of optical device metrology to measure total light loss of an optical device stack. The method 400 is operable to be performed with one or more of the configurations 200A and 200B of a measurement system 201. To facilitate explanation, the method 400 will be described with reference to the measurement system 201 of FIGS. 2A and 2B. In one embodiment, which can be combined with other embodiments described herein, the optical device is an optical device stack 210.

The method 400 is identical to the method 300 described above in reference to FIG. 3 except that the camera 206 (FIGS. 2A, 2B) is used to collect the light for the detector instead of the fiber bundle 106 (FIGS. 1A-1D). Due to this high level of similarity, the method 400 is briefly described, and it is understood that all of the description from the method 300 other than the description of the fiber bundle 106 applies to the method 400.

At operation 401, a light source 202 directs a light beam 208 to the optical device stack 210 in a similar manner as described above for directing the light beam 108 to the optical device stack 110 during operation 301.

At operation 402, the light beam 208 propagates through the optical device stack 210 in a similar manner as described above in reference to the light beam 108 propagating through the optical device stack 110 during operation 302.

At operation 403, the camera 206 collects scattered light 226 at each location $X_0, X_1 \ldots X_N$. The camera 206 has a field of view sufficiently large such that the camera 206 is stationary as the light beam 208 propagates through the optical device stack 210 enabling all of the light to be collected for all of the measurements needed. The camera 206 may be disposed above the first surface 218 (FIGS. 2A, 2B) or the second surface 220 (not shown) of the optical device stack 210.

At operation 404, a detector 216 in communication with the camera 206 measures the scattered light 226 collected by the camera 206 at each location $X_0, X_1 \ldots X_N$. The intensity measurements can then be used to determine the total optical loss for the optical device stack 210 as well as the portion of the optical loss caused by the substrate 212 and the portion caused by the optical film 214 in a similar manner as described above in reference to determining these contributions to light loss for the optical device stack 110, substrate 112, and optical film 114 during operation 304. Also, these measurements can be analyzed in a similar manner as described above in reference to operation 304 to make a determination on the amount of light loss due to light scattering as opposed to absorption. When high levels of light scattering are indicated, then changes to surface roughness or stoichiometry can be made as described above.

The method 400 can be repeated in a similar manner as described above for repeating the method 300. For example, the method 400 can be repeated, so that measurements can be performed before and after the optical film 214 is formed on the optical substrate 212. Furthermore, the method 400 can be repeated for different optical substrates and/or optical films, so that appropriate optical substrates and/or films for given applications can be more quickly identified.

In summation, embodiments of the present disclosure relate to a measurement system and a method to measure total light loss of an optical device stack and relative portion of optical loss caused by the substrate 112 (i.e., $\alpha_{bulk}$) and the relative portion of optical loss caused by the optical film 114. The measurements also enable an assessment of how much of the total light loss is due to scattering and absorption of the light. The measurement system and method of utilizing the measurement system described herein allow for measurement of low level light loss with detectors of normal sensitivity. By having the light beams propagate under TIR over a sufficient distance (i.e., numerous contact points 124 caused by the TIR), such that there is a significant decay in the intensity, detectors of normal sensitivity can be used to determine the light loss caused by the substrate and the light loss caused by the optical film.

While the foregoing is directed to embodiments of the present disclosure, other and further embodiments of the disclosure may be devised without departing from the basic scope thereof, and the scope thereof is determined by the claims that follow.

What is claimed is:

1. A method of optical device metrology comprising:
    introducing a first type of light into a first optical device during a first time period, the first optical device comprising an optical substrate and an optical film disposed on the optical substrate, the first optical device including a first surface, a second surface, and one or more sides connecting the first surface with the second surface;
    measuring, during the first time period, a quantity of the first type of light transmitted from a plurality of locations on the first surface or the second surface during the first time period, wherein the measuring is performed by a detector coupled to one or more fiber heads positioned to collect the light transmitted from the plurality of locations; and
    determining a magnitude between successive peaks and troughs in the measurements along the first surface or the second surface to determine a relative amount of optical loss due to scattering and a relative amount of optical loss due to absorption.

2. The method of claim 1, wherein the one or more fiber heads are moved relative to the first surface or the second surface during the first time period to measure the quantity of the first type of light from the plurality of locations.

3. The method of claim 1, further comprising:
    introducing the first type of light into the optical substrate during a second time period, the second time period occurring before the optical film is formed on the optical substrate; and
    measuring, during the second time period, a quantity of the first type of light transmitted from the optical substrate at locations on a surface of the optical substrate corresponding to the plurality of locations on the first optical device that the light transmitted from during the first time period to determine optical loss caused by the substrate.

4. The method of claim 3, further comprising
    using the measurements during the first time period and the second time period to determine optical loss caused by the optical film.

5. The method of claim 4, wherein
    the first surface is a surface of the optical substrate, and
    the first type of light is coupled into the first optical device through the first surface of the first optical device during the first time period.

6. The method of claim 5, wherein the plurality of locations that the light transmits from for the measuring are located on the first surface.

7. The method of claim 4, wherein
    the second surface is a surface of the optical film, and
    the first type of light is coupled into the first optical device through the second surface of the first optical device during the first time period.

8. The method of claim 7, wherein
    the first surface is a surface of the optical substrate, and
    the plurality of locations that the light transmits from for the measuring are located on the first surface.

9. The method of claim 7, wherein
    the first surface is a surface of the optical substrate, and
    the plurality of locations that the light transmits from for the measuring are located on the second surface.

10. The method of claim 4, wherein
    the first type of light is coupled into the first optical device through the first surface of the first optical device during the first time period,
    the optical film is a first optical film of the first optical device,
    the first optical device further includes a second optical film,
    the first surface is a surface of the first optical film,
    the optical substrate is positioned between the first optical film and the second optical film,
    the second surface is a surface of the second optical film, and
    the plurality of locations that the light transmits from for the measuring are located on the first surface.

11. The method of claim 1, wherein the first type of light has a wavelength with a bandwidth less than 1 picometer.

12. A method of optical device metrology comprising:
    introducing a first type of light into a first optical device during a first time period, the first optical device comprising an optical substrate and an optical film disposed on the optical substrate, the first optical device including a first surface, a second surface, and one or more sides connecting the first surface with the second surface;
    measuring, during the first time period, a quantity of the first type of light transmitted from a plurality of locations on the first surface or the second surface during the first time period, wherein the measuring is performed by a detector coupled to a camera positioned to collect the light transmitted from the plurality of locations; and
    determining a magnitude between successive peaks and troughs in the measurements along the first surface or the second surface to determine a relative amount of optical loss due to scattering and a relative amount of optical loss due to absorption.

13. The method of claim 12, wherein the camera has a field of view that covers all of the plurality of locations.

14. The method of claim 12, further comprising:
    introducing the first type of light into the optical substrate during a second time period, the second time period occurring before the optical film is formed on the optical substrate; and
    measuring, during the second time period, a quantity of the first type of light transmitted from the optical substrate at locations on a surface of the optical substrate corresponding to the plurality of locations on the first optical device that the light transmitted from during the first time period to determine optical loss caused by the substrate.

15. The method of claim 14, further comprising
    using the measurements during the first time period and the second time period to determine optical loss caused by the optical film.

16. The method of claim 15, wherein
    the first surface is a surface of the optical substrate, and
    the first type of light is coupled into the first optical device through the first surface of the first optical device during the first time period.

17. The method of claim 16, wherein the plurality of locations that the light transmits from for the measuring are located on the first surface.

18. The method of claim 15, wherein
    the second surface is a surface of the optical film, and
    the first type of light is coupled into the first optical device through the second surface of the first optical device during the first time period.

19. The method of claim 18, wherein
the first surface is a surface of the optical substrate, and
the plurality of locations that the light transmits from for the measuring are located on the first surface.

20. A method of optical device metrology comprising:
a) introducing a first type of light into a first optical device during a first time period, the first optical device comprising an optical substrate and optical film, the first optical device including a first surface, a second surface, and one or more sides connecting the first surface with the second surface;
b) measuring, during the first time period, a quantity of the first type of light transmitted from a plurality of locations on the first surface or the second surface during the first time period, wherein the measuring is performed by a detector configured to receive the light transmitted from the plurality of locations;
c) determining a magnitude between successive peaks and troughs in the measurements along the first surface or the second surface to determine a relative amount of optical loss due to scattering and a relative amount of optical loss due to absorption;
repeating operations a) b), and c) for a second optical device that includes one or more of a different optical substrate and a different optical film than the first optical device; and
selecting the first optical device or the second optical device for a larger production run based on differences between the measurements.

\* \* \* \* \*